No. 12,213. REISSUED APR. 26, 1904.
E. R. JOHNSON.
REPRODUCER SUPPORT FOR GRAMOPHONES.
APPLICATION FILED DEC. 26, 1903.
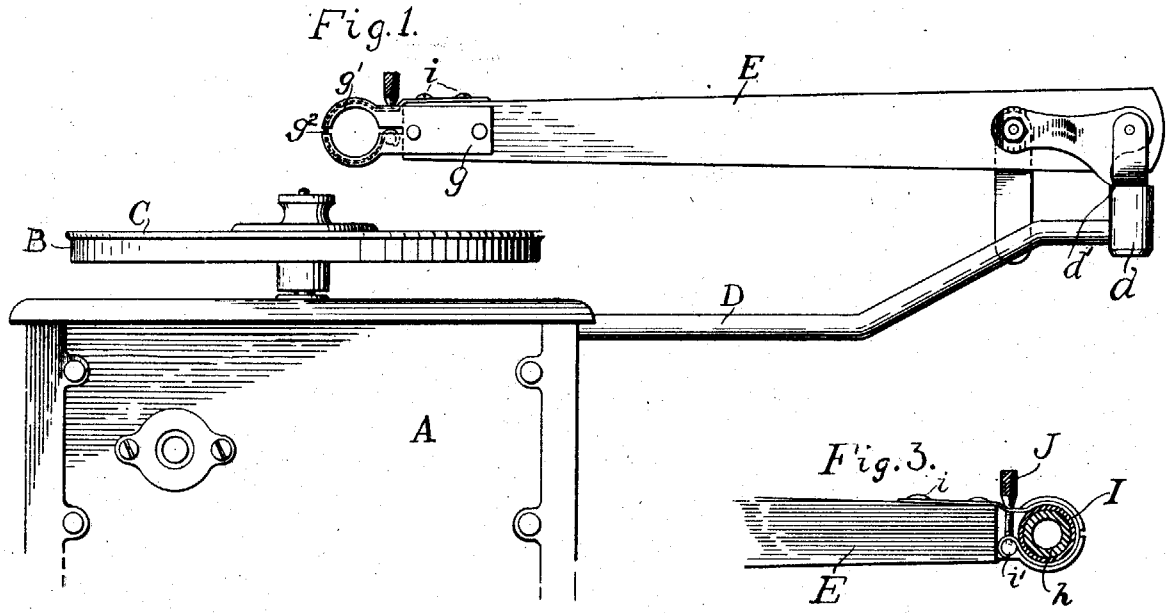
WITNESSES:
Philip Bellows.
Edw. W. Vaill Jr.
INVENTOR
Eldridge R. Johnson.
BY
Howson & Sons
ATTORNEY.

No. 12,213. Reissued April 26, 1904.

UNITED STATES PATENT OFFICE.

ELDRIDGE R. JOHNSON, OF PHILADELPHIA, PENNSYLVANIA, ASSIGNOR TO THE VICTOR TALKING MACHINE COMPANY, A CORPORATION OF NEW JERSEY.

REPRODUCER-SUPPORT FOR GRAMOPHONES.

SPECIFICATION forming part of Reissued Letters Patent No. 12,213, dated April 26, 1904.

Original No. 742,666, dated October 27, 1903. Application for reissue filed December 26, 1903. Serial No. 186,758.

*To all whom it may concern:*

Be it known that I, ELDRIDGE R. JOHNSON, a citizen of the United States, and a resident of the city of Philadelphia, State of Pennsylvania, have invented certain new and useful Improvements in Reproducer-Supports for Gramophones, of which the following is a full, clear, and exact disclosure.

This invention relates to certain improvements in gramophones or talking-machines, and more particularly to mechanism for supporting the reproducer and its horn.

The object of said invention is to provide means for holding the sound-box or reproducer and amplifying-horn on a supporting-arm and for clamping the horn to the sound-box.

Briefly, my invention comprises the providing of separate holding means, one of which is adapted more especially to give a firm support to the sound-box, while the other, in addition to supporting the sound-box and amplifying-horn, keeps the said horn securely in connection therewith, but allows either to be removed independently of the other.

For a full, clear, and exact description of one form of my invention reference may be had to the following specification and to the accompanying drawings, forming a part thereof, in which—

Figure 1 is a side elevation of a gramophone or talking-machine having my improvement applied thereto; Fig. 2, a plan view illustrating the reproducing mechanism or sound-box in position on the supporting-arm, and Fig. 3 a detail view showing the reproducer-arm in elevation and the tubular section of the sound-box and horn in section.

Referring to the drawings, A indicates the casing containing the motor mechanism, above which is the revolving turn-table B, which supports the record C.

Extending from one side of the casing A is a bracket-arm D, carrying on its outer end a sleeve *d*, in which is pivotally mounted a bifurcated arm D, which has the reproducer-arm E pivoted thereto.

On the inner end of the reproducer-arm E, I secure a flat plate *g*, having a ring G′, which may be split, as indicated at $g^2$. Said ring is preferably formed integral with said plate *g* and extends out beyond the end of the arm E, the inner diameter of said ring G′ being sufficient to cause said ring to snugly fit the tubular section *h* on the reproducer or sound-box H, so that when the section *a* is placed in the ring *g* the said ring will firmly hold the reproducer in position. On the top of the arm E, I secure a spring-clamp I, which is secured to the said arm E by means of the screws *i*. The free end of the spring clamp or band I is bent in circular form and carries adjacent its end a solid piece of metal I in the nature of a nut, in which is a screw-threaded aperture adapted to receive the lower end of an adjusting-screw J. The upper portion of the screw J passes through an aperture in the upper portion of the clamp I, as clearly illustrated in Fig. 3 of the drawings. Thus when the sound-box is placed in the ring *g′* the tubular section *h* of said sound-box extends through the circular portion of the spring-clamp I, and when the end of the horn *l* is placed over the tubular section H it also passes within the circular portion of the spring-clamp I. By regulating the adjusting-screw J the band I is contracted to bind the horn and the sound-box together, and thus form a tight connection and a firm support for those parts. The elbow *l* on the inner end of the horn is generally made of leather and is of a size sufficient to snugly embrace a tubular section of the sound-box; but from constant usage this leather tube stretches and does not engage with a sufficient degree of firmness to hold it in position, and consequently has to be tied or wrapped with wire in many instances, which is inconvenient and unsightly. My spring-clamp above described obviates any such difficulties and firmly holds the end of the horn to the sound-box. It also helps to support the sound-box in its operative position. By unscrewing the screw J a spring-band I is allowed to expand, and the horn and sound-box may be immediately separated and either or both removed. It will also be noticed that the sound-box may be removed from the supporting-arm without detaching the elbow *l* therefrom by simply loosening the screw J and allowing the sound-box to be withdrawn. The elbow and horn may also be removed independently of the sound-box, for when the said elbow is not in position within the clamp I the sound-box is supported by the ring *g'*. These features of construction particularly adapt the parts of my device to be easily assembled and separated, which is of great advantage where it is desired to carry the machine from place to place.

Having thus described one form of my invention, what I claim, and desire to protect by Letters Patent of the United States, is—

1. In a talking-machine, a reproducer-arm provided with independent means for supporting the communicating ends of the sound-box and amplifying-horn, said means being independent of the sound-passage establishing communication between said sound-box and horn.

2. In a talking-machine, the combination with the reproducer-arm, of a support adapted to receive and hold the sound-box in position, and means for receiving the end of the amplifying-horn and for holding the same in position and in operative relation to the sound-box, said support and means being independent of the sound-passage establishing communication between said sound-box and horn.

3. In a talking-machine, a reproducer-arm provided with means independent of each other for supporting the communicating ends of a sound-box and amplifying-horn, one of said means operatively engaging both the sound-box and horn when assembled, said means being independent of the sound-passage establishing communication between said sound-box and horn.

4. In a talking-machine, the combination with the reproducer-arm, of means secured to the free end of said arm and adapted to hold the sound-box in position, and means for holding the small end of the amplifying-horn in position about a portion of said sound-box.

5. In a talking-machine, a reproducer-arm, a sound-box, a horn, said sound-box entering a portion of said horn, means for holding said sound-box in position, and means for holding said horn in position, and for holding said sound-box and horn in engagement with each other, said means being independent of the sound-passage establishing communication between said sound-box and horn.

6. In a talking-machine, the combination with the reproducer-arm, of an annular support secured to the free end of said arm, and adapted to receive and hold the sound-box in position, and means also attached to the free end of said arm for holding the amplifying-horn in position and for clamping the same to the sound-box.

7. In a talking-machine, a reproducer-arm, a sound-box, a horn having a compressible portion carried thereby, a sound-box engaging said portion, means for holding said sound-box in position, and means for compressing the compressible portion of said horn into contact with said sound-box.

8. In a talking-machine, the combination with the reproducer-arm, of a plate secured thereon having an opening therein to receive the tubular portion of the sound-box and a clamp also carried by said arm adapted to hold the small end of the amplifying-horn in position and to clamp the same to the tubular portion of the sound-box.

9. In a talking-machine, the combination with the reproducer-arm, of a plate secured to the free end thereof and comprising a ring adapted to receive and hold the tubular portion of a sound-box in position, and an adjustable clamp also carried by said arm for holding the small end of the amplifying-horn in position and for clamping the same to the tubular portion of the sound-box.

10. In a talking-machine, the combination with the reproducer-arm, of a ring secured thereto for receiving the tubular portion of a sound-box, a band also secured to said arm and means for contracting said band.

11. In a talking-machine, the combination with the reproducer-arm and reproducer, of a ring secured thereto and adapted to receive the tubular portion of a sound-box, a band also attached to said arm and a thumb-screw for contracting said band.

12. In a talking-machine, the combination with the reproducer-arm and reproducer, of a plate secured to the free end of the arm having its end projecting beyond the same, the said end being provided with a circular opening to hold the tubular portion of the reproducer, a spring-band also secured to said arm, and means for contracting said spring-band.

13. In a talking-machine, the combination with the reproducer-arm and reproducer, of a plate secured to the free end of the arm having its end projecting beyond the same, the said end being provided with a circular opening to hold the tubular portion of the reproducer and being split to form clamping-sections, a spring-band also secured to said arm and means for clamping said spring-band.

14. In a talking-machine, the combination with the reproducer-arm and reproducer, of a horn and flexible connection with said horn and reproducer, a plate secured to the free end of the arm, having its end projecting beyond the same, said end being provided with a circular opening to hold the tubular portion of the reproducer, a spring-band also secured to said arm and means for clamping said spring-band about said flexible connection and tubular portion of the reproducer.

15. In a talking-machine, the combination with the reproducer-arm and reproducer, of a horn, a flexible connection between said horn and reproducer, a plate secured to the free end of the arm having its end projecting beyond the same, the said end being provided with a circular opening to hold the tubular portion of the reproducer and being split to form spring clamping-sections, a spring-band also secured to said arm, and means for clamping said spring-band about said flexible connection and tubular portion of the reproducer.

In witness whereof I have hereunto set my hand this 21st day of December, A. D. 1903.

ELDRIDGE R. JOHNSON.

Witnesses:
FREDK. C. EBERHARDT,
CHAS. K. BENNETT.